United States Patent [19]

Bader

[11] Patent Number: 5,020,385

[45] Date of Patent: Jun. 4, 1991

[54] MOTOR-VEHICLE GEAR-CHANGE TRANSMISSION

[75] Inventor: Josef Bader, Friedrichshafen, Fed. Rep. of Germany

[73] Assignee: Zahnradfabrik Friedrichshafen AG, Friedrichshafen, Fed. Rep. of Germany

[21] Appl. No.: 456,383

[22] Filed: Dec. 26, 1989

[30] Foreign Application Priority Data

Jan. 21, 1989 [DE] Fed. Rep. of Germany ....... 3901755

[51] Int. Cl.$^5$ .............................................. F16H 3/08
[52] U.S. Cl. ..................................... 74/333; 384/453; 384/605; 384/610
[58] Field of Search ................. 74/333, 363, 369, 375, 74/377; 384/453, 557, 563, 605, 610, 905

[56] References Cited

U.S. PATENT DOCUMENTS

| 2,334,002 | 11/1943 | Heintz et al. | 384/453 |
| 2,352,469 | 6/1944 | Carlson | 384/605 |
| 3,261,222 | 7/1966 | Freshman et al. | 74/375 |

FOREIGN PATENT DOCUMENTS

| 0510978 | 11/1953 | Belgium | 384/563 |
| 0105969 | 10/1898 | Fed. Rep. of Germany | 384/563 |
| 0917431 | 7/1954 | Fed. Rep. of Germany | 384/563 |
| 1124319 | 2/1962 | Fed. Rep. of Germany | 384/610 |
| 3417699 | 10/1987 | Fed. Rep. of Germany | |
| 0264367 | 12/1926 | United Kingdom | 384/610 |

Primary Examiner—Allan D. Herrmann
Assistant Examiner—Ryan W. Massey
Attorney, Agent, or Firm—Herbert Dubno; Andrew Wilford

[57] ABSTRACT

A motor-vehicle transmission has a housing extending along an axis and having axially spaced front and rear sides, a main input shaft centered on the axis and having a front end at the front housing side and a rear end spaced axially backward therefrom, a main output shaft centered on the axis and having a front end at the input-shaft rear end and a rear end at the rear housing side, and a secondary countershaft adjacent the input and output shafts and having front and rear ends respectively at the front and rear housing sides. A cylindrical-roller bearing supports the output-shaft front end on the input-shaft rear end for rotation therein and prevents relative radial movement but permits relative axial movement of the input-shaft rear end and output-shaft front end. Roller-type axial-thrust bearings support the input-shaft front end, the output-shaft rear end, and one of the ends of the countershaft on the housing. A main support element braced axially rearward against the output-shaft front end and the input-shaft rear end is rotationally coupled to one of the main shafts and a main spring braced between the one main shaft and the support element urges same axially against the other main shaft. A secondary support element braced axially between the other end of the countershaft and the housing is carried in another axial-thrust bearing on the housing and is rotationally coupled to the countershaft. A secondary spring braced between the countershaft and the secondary support element urges same axially apart.

8 Claims, 2 Drawing Sheets

MOTOR-VEHICLE GEAR-CHANGE TRANSMISSION

FIELD OF THE INVENTION

The present invention relates to a transmission. More particularly this invention concerns a gear-change transmission for a motor vehicle.

BACKGROUND OF THE INVENTION

A standard gear-change transmission has a housing, typically of cast aluminum, in which are provided input, output, and counter shafts, typically of machined steel. The input and output shafts are coaxial and the countershaft is parallel to but spaced from the input/output-shaft axis. Four housing bearings support the input-shaft front end, output-shaft rear end, and both ends of the countershaft in the housing and a fifth bearing supports the front end of the output shaft on the rear end of the input shaft. In the standard synchromesh transmission gears that are in continuous mesh are provided on the shafts and various clutches can be closed to establish the speed ratio between the input shaft and the output shaft.

A main problem in such arrangements is that the coefficients of thermal expansion are different for the aluminum housing and the steel shafts. The result is that bearings that are perfectly centered when the transmission is constructed and generally at room temperature will become too tight or too loose when the transmission heats up, which it does invariably in use.

In German patent 3,417,699 issued 15 Oct. 1987 to H. Bender this differential-expansion problem is solved by making the countershaft and output shaft as two-part telescoping structures including a thermal-expansion element whose own expansion is such that the respective shafts will expand and contract the same as the housing. While relatively effective, this system nonetheless requires that the five bearings be meticulously fitted and in general the construction of this thermal-compensated transmission is quite expensive.

OBJECTS OF THE INVENTION

It is therefore an object of the present invention to provide an improved speed-change transmission.

Another object is the provision of such an improved speed-change transmission which overcomes the above-given disadvantages, that is which is thermally compensated but which is still of relatively simple and inexpensive construction.

SUMMARY OF THE INVENTION

A motor-vehicle transmission according to the invention has a housing extending along an axis and having axially spaced front and rear sides, a main input shaft centered on the axis and having a front end at the front housing side and a rear end spaced axially backward therefrom, a main output shaft centered on the axis and having a front end at the input-shaft rear end and a rear end at the rear housing side, and a secondary countershaft adjacent the input and output shafts and having front and rear ends respectively at the front and rear housing sides. A cylindrical-roller bearing supports the output-shaft front end on the input-shaft rear end for rotation therein and prevents relative radial movement but permits relative axial movement of the input-shaft rear end and output-shaft front end. Roller-type axial-thrust bearings support the input-shaft front end, the output-shaft rear end, and one of the ends of the countershaft on the housing. A main support element between the output-shaft front end and the input-shaft rear end is rotationally coupled to one of the main shafts and a main spring braced between the one main shaft and the support element urges same axially against the other main shaft. A secondary support element between the other end of the countershaft and the housing is carried in another axial-thrust bearing on the housing and is rotationally coupled to the countershaft. A secondary spring braced between the countershaft and the secondary support element urges same axially apart.

The use of a cylindrical-roller bearing between the input and output shafts prevents any misalignment at this critical location because this bearing is only radially effective. The axially spring-loaded support of the shafts makes it possible to ignore any minor tolerance errors during transmission construction, as the spring prestressing is set for the desired axial force on the axial-thrust bearings, keeping them tight. Even when the transmission changes size slightly, as it inherently does when warm, the springs keep the bearings tight and operational. Instead of the normal tightening up encountered in a standard transmission when hot, the system of this invention maintains the same axial prestressing on the bearings. Even when the transmission is very cold, the spring-loading ensures that the bearings remain tight so that their self-pumping lubrication action is effective.

According to further features of this invention the support elements and the respective shafts have axially closely spaced and confronting faces flatly engageable with each other on excessive axial stressing of the respective shafts. Thus when a high peak load shifts the input and output shafts axially together, the gap between them can close momentarily to protect the parts.

Furthermore according to this invention the main support element and the other main shaft are formed on the axis with confronting part-spherical seats and a ball is seated in the seats and axially centers the one main shaft and the element in each other. These seats are lined with a friction-reducing layer, for instance polytetrafluoroethylene or molybdenum disulfide.

The main support element of this invention has a stem and a head and the main spring is braced between the on main shaft and the stem and the ball is between the head and the other main shaft. This is an extremely simple construction that ensures perfect centering of the main shafts relative to each other. The rotation-coupling formations can be an interfitting radially interfitting groove and tooth formed on the head and input shaft or output shaft, depending on the orientation of the device.

The secondary element in accordance with this invention is a thimble axially slidable on the other end of the counter shaft and having a flange braced axially against the other axial-thrust bearing. The respective rotation coupling formation is an interfitting diametral groove and ridge formed in the thimble and other end of the countershaft and the secondary spring is recessed in the other end of the countershaft and bears against the thimble.

DESCRIPTION OF THE DRAWING

The above and other objects, features, and advantages will become more readily apparent from the following, reference being made to the accompanying drawing in which.

SPECIFIC DESCRIPTION

Figure 1:
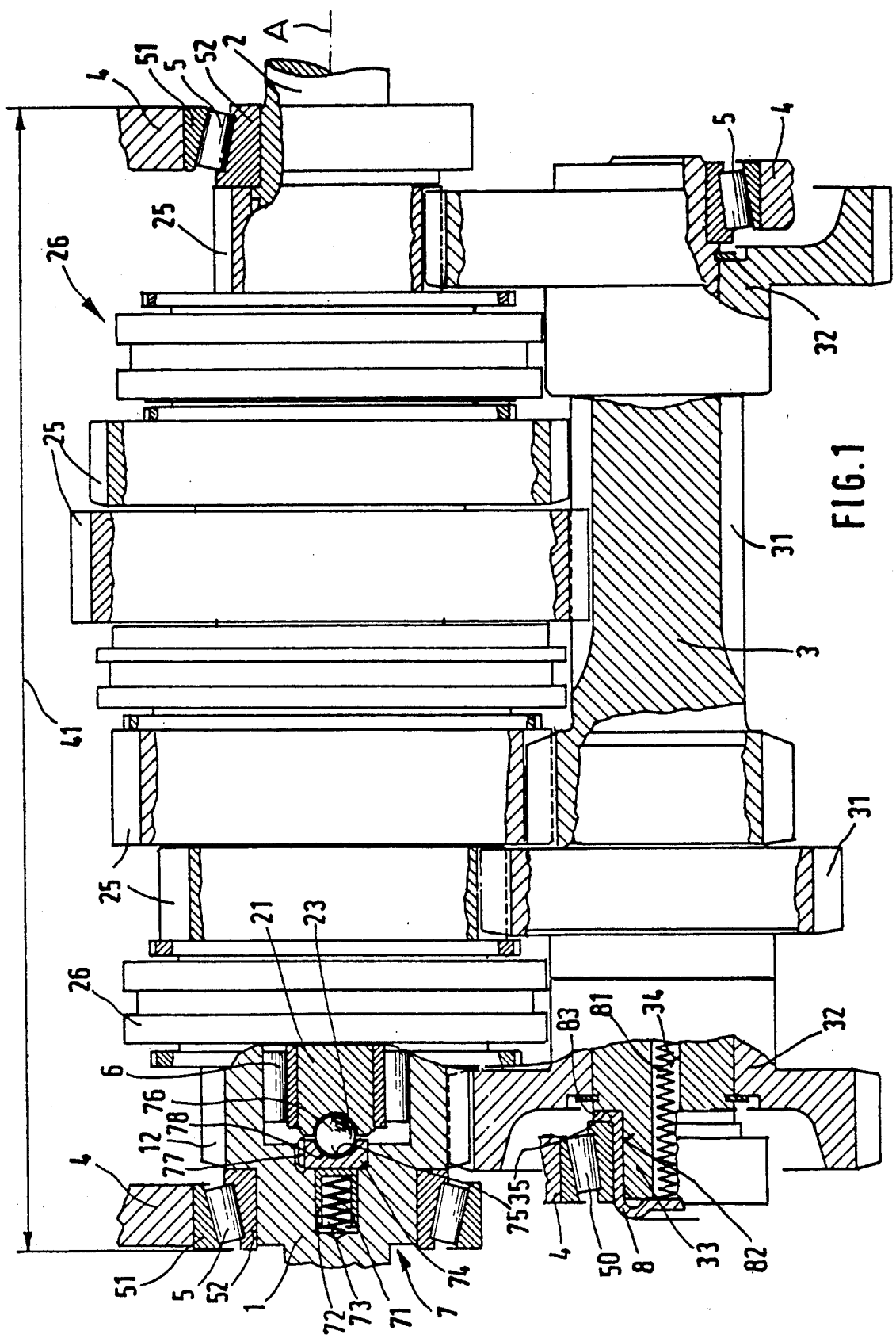
FIG. 1 is an axial section through a transmission according to this invention.

As seen in FIG. 1 a transmission according to this invention has a cast-aluminum housing 4 in which are provided input and output shafts 1 and 2 extending along a common axis A and a back-gearing or countershaft 3 extending along an axis parallel to the axis A. The shaft 1 is connected normally to the drive engine of the vehicle and the shaft 2 to the wheels. The shaft 1 is formed integrally with a drive pinion 12 and the shaft 2 has gears 25. Further gears 31 and 32 meshing with the gears 12 and 25 are responsible for the various transmission ratios, and clutches 26 on the shaft 2 serve for selecting the desired ratio.

The front end of the shaft 1 and the rear ends of the shafts 2 and 3 are supported in the housing 4 by tapered-roller axial thrust bearings 5 each having an outer race 51 fixed in the housing 4 and an inner race 52 fixed on the respective shaft 1, 2, or 3. These bearings 5 are set according to the overall housing length 41.

Figure 2:
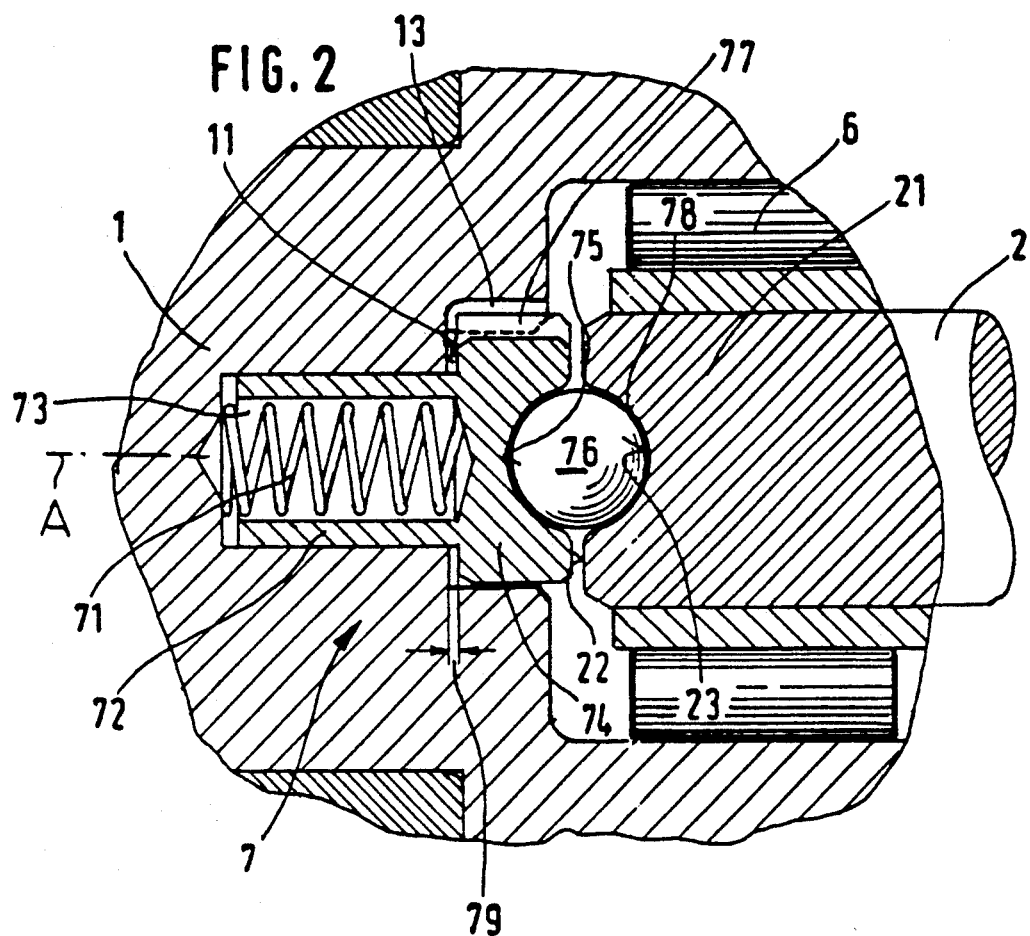
FIGS. 2 and 3 are large-scale views of details of FIG. 1.

In accordance with this invention as seen in FIG. 2 the front end of the shaft 2 is supported in the rear end of the shaft 1 by a sleeve-type element 7 having a tubular stem 72 centered on the axis A, received in the shaft 1, and having a hollow interior 73 housing a coil-type compression spring 71 braced axially between the element 7 and shaft 1. This element 7 has a stubby cylindrical head 74 formed centered on the axis A with a part-spherical seat 75 that opens rearward. This head 74 is formed with a radially outwardly projecting tooth 77 that engages in a radially inwardly opening groove 13 formed in the shaft 1 to couple the element 7 with the shaft 1. The head 74 has a front surface normally spaced by a distance 79 from the rear surface 11 of the shaft 1.

The shaft 2 is formed with a forwardly open part-spherical seat 23 also centered on the axis A and directly confronting the seat 75. A ball 76 is received in the seats 23 and 75 which typically have a friction coating 78 and holds the rear face of the element 7 at a spacing from a front face 22 of the shaft 2.

Figure 3:
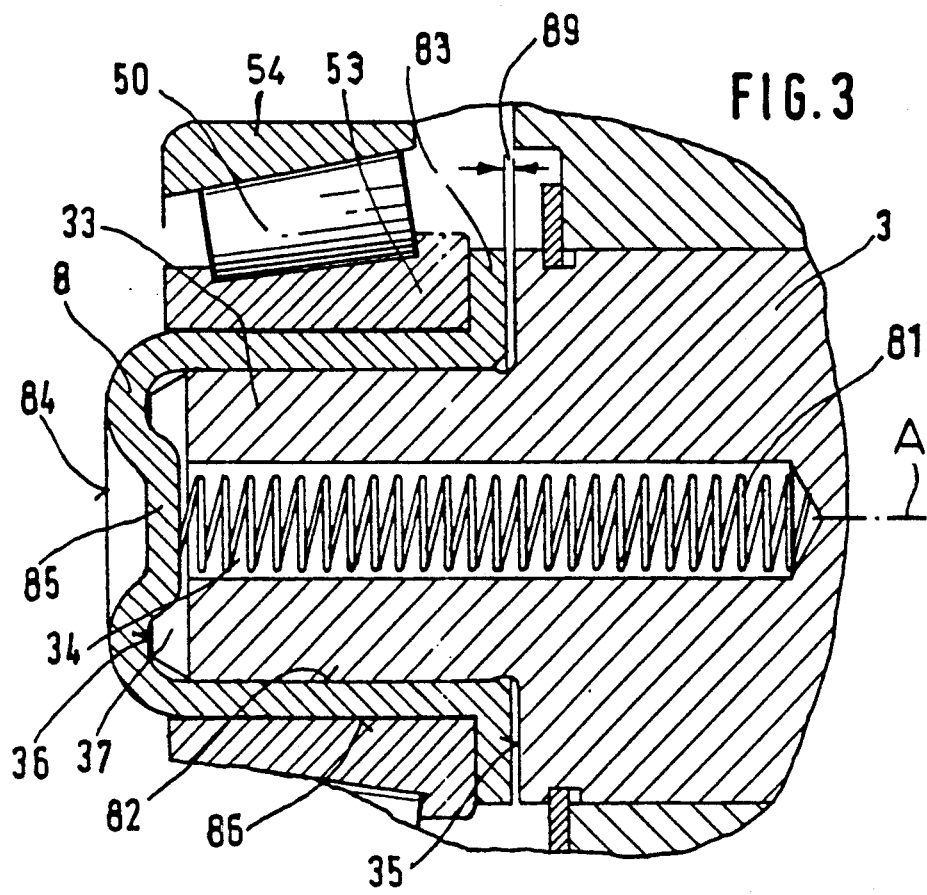

Similarly as shoWn in FIG. 3 the shaft 3 has a forward extension 33 axially slidably received on a cylindrical inner surface 82 of a thimble or cup element 8 having a flange 83 resting against an inner race 53 of an axial-thrust bearing 50 whose outer race 54 is seated in the housing 4 and snugly engaged around an outer surface 86 of the element 8. This flange 83 has a rear face spaced by a short distance 89 like the distance 79 from a front face 35 of the shaft 2.

The element 8 has a front end 84 formed with a rearwardly projecting diametral rib 85 received in a diametral notch 37 cut into a front face 36 of the extension 33. Another coil-type compression spring 81 is received in a forwardly open bore 34 formed in the extension and is braced axially between the shaft 3 and the element 8.

Thus with the system of this invention any differential expansion or contraction of the shafts 1 through 3 relative to the housing 4 will be taken up by compression or extension of the springs 71 and 81. The axial-thrust bearings 5 and 50 will remain tight and lubricated. Any excessive axial stresses will be countered by bottoming with closing of the spaces 79 and 81, if necessary, so that the system will remain fairly rugged and well protected. The bearing 6 will remain protected because it transmits no axial forces.

I claim:

1. A motor-vehicle transmission comprising:

a housing extending along an axis and having axially spaced front and rear sides;

a main input shaft centered on the axis and having a front end at the front housing side and a rear end spaced axially backward therefrom;

a main output shaft centered on the axis and having a front end at the input-shaft rear end and a rear end at the rear housing side;

a secondary countershaft adjacent the input and output shafts and having front and rear ends respectively at the front and rear housing sides;

a cylindrical-roller bearing supporting the output-shaft front end on the input-shaft rear end for rotation therein, the cylindrical-roller bearing preventing relative radial movement but permitting relative axial movement of the input-shaft rear end and output-shaft front end;

respective roller-type axial-thrust bearings supporting the input-shaft front end, the output-shaft rear end, and one of the ends of the countershaft on the housing;

a main support element between the output-shaft front end and the input-shaft rear end;

formations rotationally coupling the support element to one of the main shafts;

a main spring braced between the one main shaft and the support element and urging same axially against the other main shaft;

a secondary support element between the other end of the countershaft and the housing;

another axial-thrust bearing supporting the secondary support element on the housing;

formations rotationally coupling the secondary support element to the countershaft; and a secondary spring braced between the countershaft and the secondary support element and urging same axially apart.

2. The transmission defined in claim 1 wherein the support elements and the respective shafts have axially closely spaced and confronting faces flatly engageable with each other on excessive axial stressing of the respective shafts.

3. The transmission defined in claim 1 wherein the main support element and the other main shaft are formed on the axis with confronting part-spherical seats, the transmission further comprising a ball seated in the seats and axially centering the one main shaft and the element in each other.

4. The transmission defined in claim 3 wherein the seats are lined with a friction-reducing layer.

5. The transmission defined in claim 3 wherein the main support element has a stem and a head, the main spring being braced between the one main shaft and the stem, the ball being between the head and the other main shaft.

6. The transmission defined in claim 1 wherein the secondary element is a thimble axially slidable on the other end of the counter shaft and having a flange braced axially against the other axial-thrust bearing, the secondary formation being an interfitting diametral groove and ridge formed in the thimble and other end of the countershaft, the secondary spring being recessed in the other end of the countershaft and bearing against the thimble.

7. A motor-vehicle transmission comprising:

a housing extending along an axis and having axially spaced front and rear sides;

a main input shaft centered on the axis and having a front end at the front housing side and a rear end spaced axially backward therefrom;

a main output shaft centered on the axis and having a front end at the input-shaft rear end and a rear end at the rear housing side the front end being formed with an axially forwardly open part-spherical seat;

a secondary countershaft adjacent the input and output shafts and having front and rear ends respectively at the front and rear housing sides;

a cylindrical-roller bearing supporting the output-shaft front end on the input-shaft rear end for rotation therein, the cylindrical-roller bearing preventing relative radial movement but permitting relative axial movement of the input-shaft rear end and output-shaft front end;

roller-type axial-thrust bearings supporting the input-shaft front end, the output-shaft rear end, and one of the ends of the countershaft on the housing;

a main support element formed with a rearwardly open part-spherical seat;

a ball seated in the seats of the main shafts at the axis and maintaining the rear end of the input shaft slightly axially spaced from the front end of the output shaft;

formations rotationally coupling the support element to the input shaft;

a main spring braced between the input shaft and the support element and urging same axially against the output shaft;

a secondary support element braced axially between the other end of the countershaft and the housing;

another axial-thrust bearing supporting the secondary support element on the housing;

formations rotationally coupling the secondary support element to the countershaft; and a secondary spring braced between the countershaft and the secondary support element urging same axially apart.

8. A motor-vehicle transmission comprising:

a housing extending along an axis and having axially spaced front and rear sides;

a main input shaft centered on the axis and having a front end at the front housing side and a rear end spaced axially backward therefrom;

a main output shaft centered on the axis and having a front end at the input-shaft rear end and a rear end at the rear housing side;

a secondary countershaft adjacent the input and output shafts and having front and rear ends respectively at the front and rear housing sides;

a cylindrical-roller bearing supporting the output-shaft front end on the input-shaft rear end for rotation therein, the cylindrical-roller bearing preventing relative radial movement but permitting relative axial movement of the input-shaft rear end and output-shaft front end;

respective roller-type axial-thrust bearings supporting the input-shaft front end, the output-shaft rear end, and one of the ends of the countershaft on the housing;

a main support element between the output-shaft front end and the input-shaft rear end;

formations rotationally coupling the support element to one of the main shafts;

a main spring braced between the one main shaft and the support element urging same axially against the other main shaft;

a secondary support thimble fitted over the other end of the countershaft and having a flange;

another axial-thrust bearing braced axially against the flange and supporting the secondary support thimble on the housing;

formations rotationally coupling the secondary support thimble to the countershaft; and a secondary spring braced between the countershaft and the secondary support thimble urging same axially apart.

* * * * *